United States Patent [19]
Halligan et al.

[11] Patent Number: 6,009,535
[45] Date of Patent: Dec. 28, 1999

[54] SCSI ADAPTOR FAILOVER FOR A DISK DRIVE SYSTEM

[75] Inventors: Kenneth A. Halligan, Leominster; Erez Ofer, Brookline; John T. Fitzgerald, Mansfield; Natan Vishlitsky, Brookline, all of Mass.

[73] Assignee: EMC Corporation, Hopkinton, Mass.

[21] Appl. No.: 08/885,697

[22] Filed: Jun. 30, 1997

[51] Int. Cl.[6] .................................................. G06F 11/00
[52] U.S. Cl. ............................................................. 714/5
[58] Field of Search ....................... 395/182.03; 364/184, 364/266.5, 268.9, 268, 269.3; 714/5

[56] References Cited

U.S. PATENT DOCUMENTS

| | | | |
|---|---|---|---|
| 5,089,958 | 2/1992 | Horton et al. | 395/182.03 |
| 5,450,579 | 9/1995 | Johnson | 395/650 |
| 5,720,028 | 2/1998 | Matsumoto et al. | 395/182.07 |
| 5,724,501 | 3/1998 | Dewey et al. | 395/182.07 |
| 5,768,623 | 9/1995 | Judd et al. | 395/857 |
| 5,838,891 | 3/1996 | Mizuno et al. | 395/182.03 |

*Primary Examiner*—Robert W. Beausoliel, Jr.
*Assistant Examiner*—Stephen C. Elmore
*Attorney, Agent, or Firm*—Fish & Richardson P.C.

[57] ABSTRACT

The invention relates to a disk drive controller system having redundant operations spread between at least two SCSI adaptors connected to a SCSI bus. At least one host computer is also connected to the SCSI bus. If one of the SCSI adaptors fails, the other SCSI adaptor connected to the bus, upon detecting the failure, takes over for the devices serviced by the failing SCSI adaptor. A special termination connection, in which one SCSI adaptor terminates the SCSI bus while the other SCSI adaptor does not, is provided for implementing the invention. A defined process enables the detecting SCSI adaptor to take over for the failed SCSI adaptor and for the failed SCSI adaptor to thereafter return to normal operation.

10 Claims, 3 Drawing Sheets

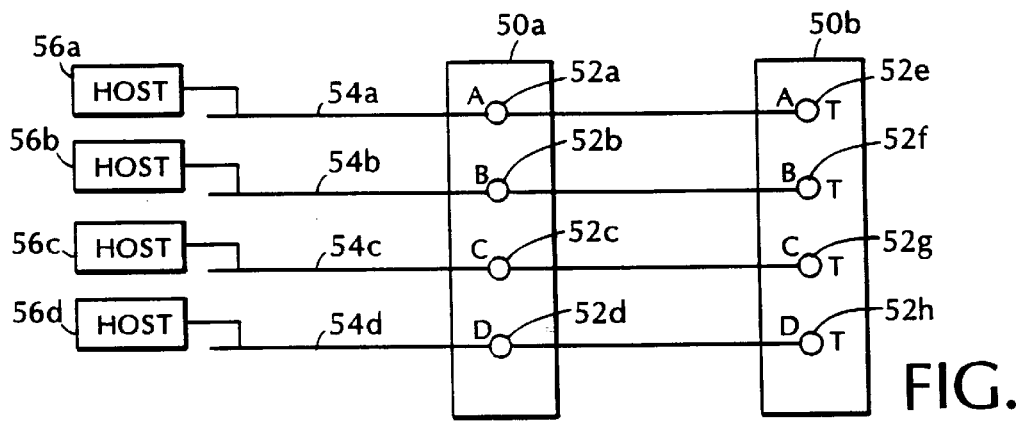
FIG. 3
| Byte | Contents | |
|---|---|---|
| 0 | "V"? - | Valid Record |
| 1 | Owner - | SA owner that owns this record entry |
| 2 | Partner - | SA backup partner |
| 3 | Active? - | SA currently in control |
| 4-7 | Time - | Time stamp of last change in table |
FIG. 4
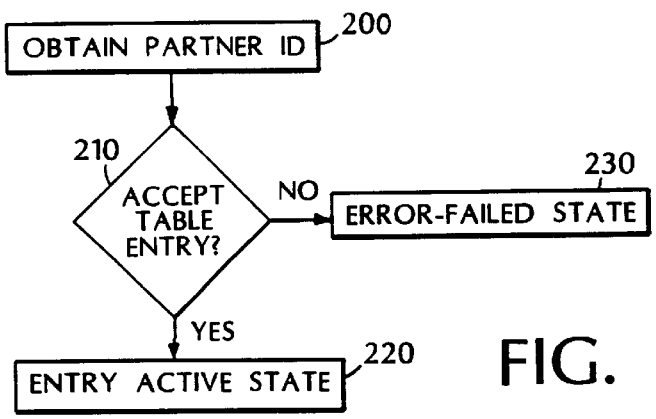
FIG. 5

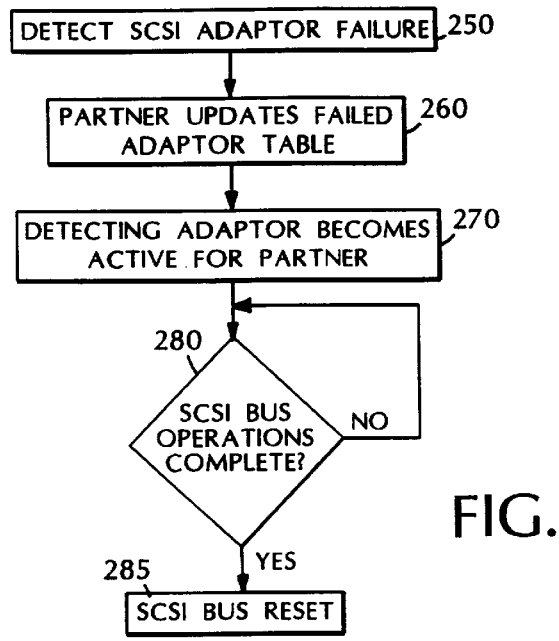
FIG. 6
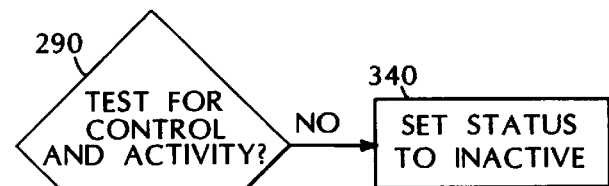
FIG. 7
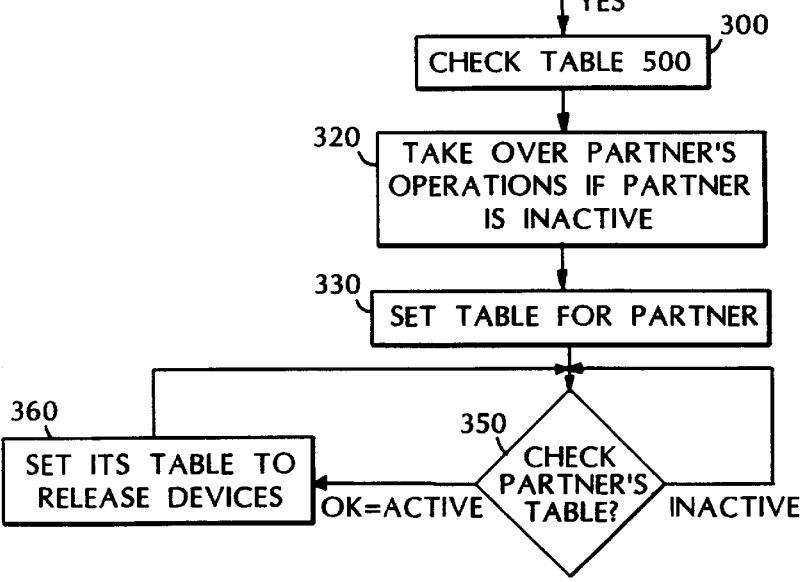

SCSI ADAPTOR FAILOVER FOR A DISK DRIVE SYSTEM

BACKGROUND OF THE INVENTION

The invention relates generally to disk drive systems, and in particular, to the performance and reliability of large scale disk drive systems.

Disk drive systems have grown enormously in both size and sophistication in recent years. These systems can typically include many large disk drive units controlled by a complex multi-tasking disk drive controller such as the EMC Symmetrix disk drive controller. A large scale disk drive system can typically receive commands from a number of host computers and can control a large number of disk drive mass storage elements, each mass storage unit being capable of storing in excess of several gigabytes of data. There is every reason to believe that both the sophistication and size of the disk drive systems, and our reliance upon them, will continue to increase.

As the systems grow in complexity, it is increasingly less desirable to have interrupting failures at either the disk drive or at the controller level. As a result, systems have become more reliable and the mean time between failures continues to increase. Nevertheless, it is more than an inconvenience to the user should the disk drive system go "down" or off-line; even though the problem is corrected relatively quickly, meaning within hours. The resulting lost time adversely affects not only system throughput performance, but user application performance. Further, the user is not concerned whether it is a physical disk drive, or its controller which fails, it is the inconvenience and failure of the system as a whole which causes user difficulties.

Many disk drive systems, such as the EMC Symmetrix disk drive system, rely upon standardized buses to connect the host computer to the controller, and to connect the controller and the disk drive elements. Thus, should the disk drive controller connected to the bus fail, the entire system, as seen by the host computer, fails and the result is, as noted above, unacceptable to the user.

SUMMARY OF THE INVENTION

The invention generally relates to a disk drive controller system having a plurality of bus adaptors connected to at least one host computer over at least one communications bus. The disk drive controller system features the plurality of bus adaptors, each having at least one port, and each communications bus is configured for connection to at least one input/output port of a host computer for receiving data for storage by the disk drive controller or for providing data to the hosts. Each communications bus is connected to corresponding ports of at least two bus adaptors. The invention further features one of the at least two bus adaptors being connected to the communications bus acting as the active adaptor for the host computer port and another adaptor connected to the communications bus configured to back up the active adaptor. The system further features an adaptor memory for storing and updating the configuration of the adaptors, and each bus adaptor is configured to take over for a failed adaptor with which it is partnered for acting upon communications over the bus.

More particularly, the invention generally relates to a disk drive controller system having a plurality of SCSI (serial connected signal interface) adaptors connected to at least one host computer over at least one SCSI bus. One of the SCSI adaptors on the bus acts as a SCSI terminator, terminating the bus. The other SCSI adaptors on the bus do not act as termination nodes. The disk drive controller system features the plurality of SCSI adaptors, each having at least one port, and each SCSI bus configured for connection to at least one input/output port of a host computer for receiving data for storage by the disk drive controller or for providing data to the hosts. Each SCSI bus is connected to corresponding ports of at least two SCSI adaptors. The invention further features one of the at least two SCSI adaptors being connected to the SCSI bus acting as the active adaptor for the host computer port and another adaptor connected to the SCSI bus configured to back up the active adaptor. The system further features an adaptor memory for storing and updating the configuration of the adaptors, and each adaptor is configured to take over for a failed adaptor with which it is partnered for acting upon communications over the SCSI bus.

The system further features each SCSI adaptor sending a heartbeat clock signal to global memory, for periodically indicating that the adaptor is functioning properly, and in another aspect, each SCSI adaptor sends a failure assist signal to a partner SCSI adaptor whenever a failure event is recognized by one of the SCSI adaptors.

In yet other aspects of the invention, the system features each SCSI adaptor periodically accessing a global memory, in particular, the adaptor's space within the global memory, and in response to data in the space, deciding whether to assume or remain the active adaptor of the adaptor pair for a particular port.

In another aspect, the invention relates to a method for providing a physical backup for a bus adaptor which receives and transmits read and write commands, respectively, from and to a host computer port. The invention features the steps of connecting to a communications bus, to which a host computer port will also be connected, at least one controller port of each of at least two bus adaptors; designating for each controller port, one of the bus adaptors connected to the communications bus as the active bus adaptor, the other bus adaptor(s) connected to the bus being the inactive bus adaptors for such ports; and monitoring the operation of the bus adaptors whereby a previously inactive bus adaptor for a port can take over for the active bus adaptor if the active SCSI adaptor fails to operate properly.

In another aspect, more particularly, the invention relates to a method for providing a physical backup for a SCSI adaptor which receives and transmits read and write commands, respectively, from and to a host computer port. The invention features the steps of connecting to a SCSI bus, to which a host computer port will also be connected, at least one controller port of each of at least two SCSI adaptors; terminating the bus at one of the at least two SCSI adaptors; designating for each controller port, one of the SCSI adaptors connected to the SCSI bus as the active SCSI adaptor, the other SCSI adaptor(s) connected to the bus being the inactive SCSI adaptors for such ports; and monitoring the operation of the SCSI adaptors whereby a previously inactive SCSI adaptor can take over for the active SCSI adaptor if the active SCSI adaptor fails to operate properly.

The method further features for the monitoring step, the step of sending, periodically, from each SCSI adaptor, a heartbeat signal to be accessed in global memory by each other SCSI adaptor. In another aspect, the monitoring step features the step of sending a failure signal over the SCSI bus whenever a SCSI adaptor identifies a failure event at the transmitting, previously active, SCSI adaptor. In yet another aspect, the method features the step of changing the active SCSI adaptor on the bus whenever a failure mode of the active SCSI adaptor is detected during the monitoring step.

As a result, the invention advantageously provides for failover protection whereby the failure of one disk drive controller SCSI adaptor will not prevent continued and reliable operation, as seen by the host, of the disk drive system. While there may be some time delay, depending upon the monitoring step and apparatus used, and a possible decrease in performance (since one SCSI adaptor will be handling the load of two adaptors), this system provides continuous and reliable information flow between the host computer and the disk drives.

BRIEF DESCRIPTION OF THE DRAWINGS

Other features and advantages of the invention will be apparent from the following description, taken together with the drawings in which:

FIG. 3 is a schematic block diagram illustrating system operation in accordance with one embodiment of the invention;

FIG. 4 is an example of SCSI adaptor global table entry; and

FIGS. 5–7 are flowcharts illustrating system operation in accordance with an embodiment of the invention.

DESCRIPTION OF PARTICULAR PREFERRED EMBODIMENTS

Figure 1:
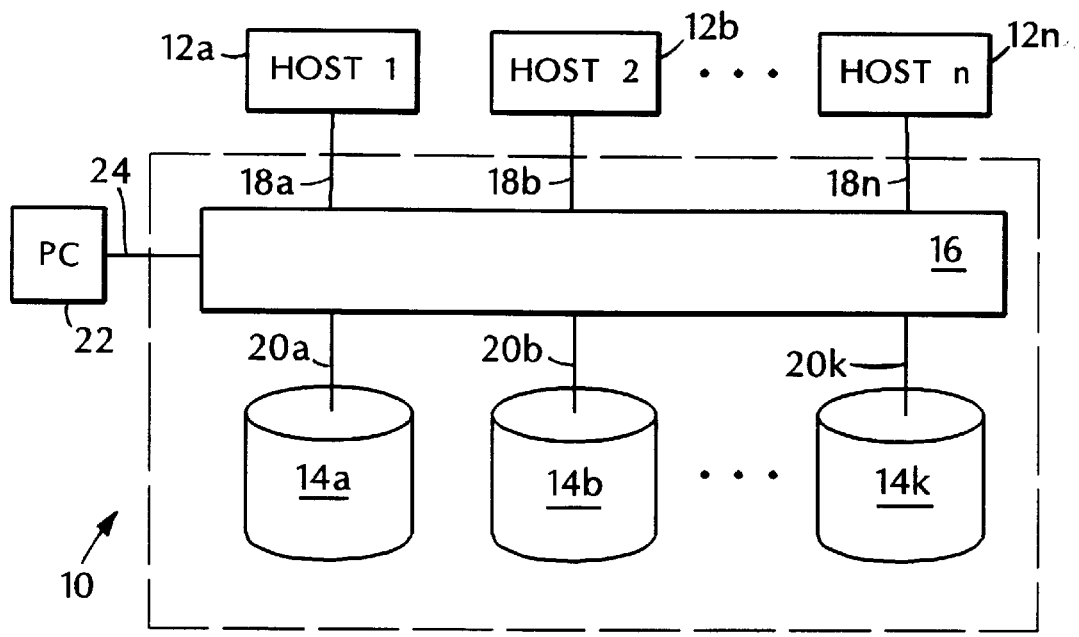
FIG. 1 is a schematic block diagram of the system in accordance with the invention.

Referring to FIG. 1, the invention relates to a computer system 10 which has a plurality of host computers 12a, 12b, . . . , 12n and a mass storage system 13 having a plurality of disk drive elements 14a, 14b, . . . , 14k. Interconnecting the host computers 12 and the disk drive elements 14 is a disk drive controller 16, for example that manufactured and sold by EMC Corporation and known as the Symmetrix controller. The disk drive controller 16 receives memory commands from the various host computers over buses 18a, 18b, . . . , 18n respectively, for example connected and operating in accordance with a SCSI protocol, and delivers the data associated with those commands to or from the appropriate disk drive elements 14 over respective connected buses 20a, 20b, . . . , 20k. Buses 20 also preferably operate in accordance with a SCSI protocol.

Each of the disk drive elements typically has in excess of a one gigabyte of memory and is logically divided, in accordance with known techniques, into a plurality of logical volumes. Each disk drive element 14 can thus have a plurality of logical volumes, for example, four, eight, or more logical volumes, on a single disk drive element. In a typical configuration, the controller system also connects to a console PC 22 through a connecting bus 24. The console PC (personal computer) 22 can be used for maintenance and access to the controller and can be employed to set parameters of or initiate maintenance commands to the controller, under user control, as is well known in the art.

As indicated above, in operation, it is desirable to maintain reliable data communications between the host computers and the disk drive elements even in the event of disk controller failure. In order to obtain this desirable result, a new redundant configuration of the disk drive controller is provided, making use of the particular features of the controller architecture and the connecting buses.

Figure 2:
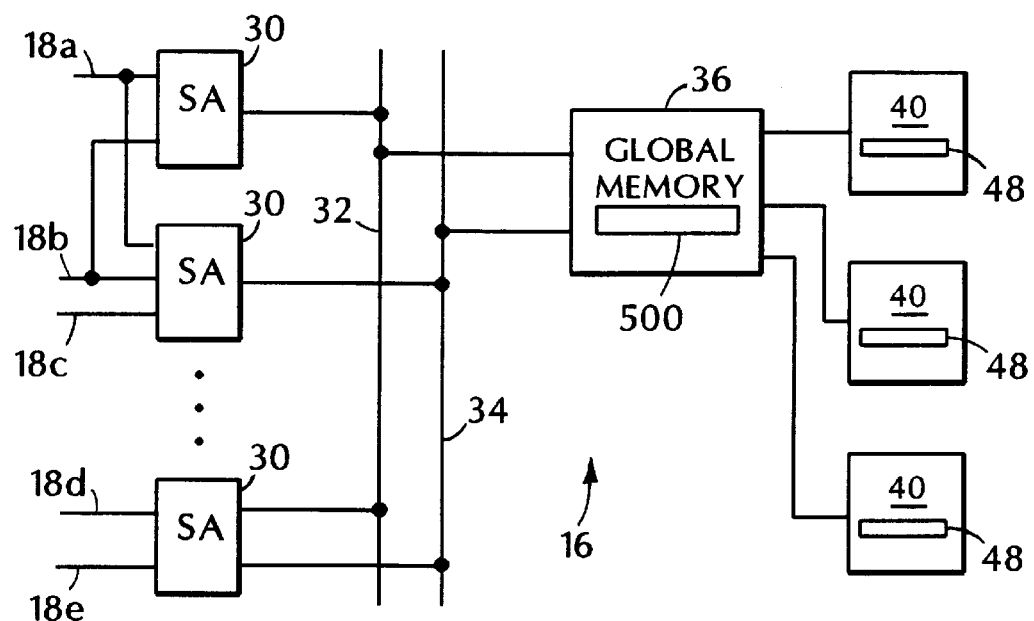
FIG. 2 is a schematic block diagram illustrating a disk controller system in accordance with the invention.

Accordingly, referring to FIG. 2, within the disk controller 16 to which the invention is particularly useful, each host computer connects to a channel director 30 (also referred to as a SCSI adaptor) over the SCSI bus lines 18. Each channel director in turn connects to one or more system buses 32 or 34 to global memory 36. The global memory preferably includes a large cache memory through which the channel directors can communicate with the disk directors 40, which in turn control the disk drives 14.

Referring to FIG. 3, in a preferred embodiment of the invention, the disk controller system has two SCSI adaptors 50a and 50b, (in general, the controller system will have many pairs of SCSI adaptors) each having a plurality of ports. In the illustrated embodiment, each SCSI adaptor is shown as having four ports 52a, 52b, 52c, and 52d on SCSI adaptor 50a, and 52e, 52f, 52g, and 52h on SCSI adaptor 50b. Corresponding ports between the two adaptors are paired so that ports 52a and 52e form a first pair, ports 52b and 52f form a second pair, ports 52c and 52g form a third pair, and ports 52d and 52h form a fourth pair. Each pair of ports connects to a SCSI bus 54a, 54b, 54c, or 54d and host computers are connected to each SCSI bus (and the same computer can be connected to more than one SCSI bus).

In accordance with the illustrated embodiment of the invention, each SCSI bus 54 is terminated at one of the SCSI adaptors of a pair (indicated by a "T"). In the illustrated embodiment of FIG. 3, the SCSI adaptor 50d terminates each of the SCSI buses. The SCSI buses are not terminated, therefore, at the other connected ports, respectively, of SCSI adaptor 50a.

In operation, therefore, the paired partnership of SCSI adaptors 50a and 50b, for each pair of ports, is either the active (and hence operative) adaptor or is the inactive (backup) adaptor. The active adaptor is the unit which responds to requests from the host computer(s) connected to the bus, while the inactive adaptor operates in the background keeping track, as necessary, of events occurring on the bus, but not participating in the active receipt or delivery of data. Each of the buses 54 can have the same, or different active SCSI adaptors as set by the system (through console PC 22 and stored in an EPROM (electronically programmable read only memory) local to the SCSI adaptor). Thus, for example, SCSI adaptor 50a can be active for SCSI buses 54a and 54b and inactive for SCSI buses 54c and 54d. Correspondingly, SCSI adaptor 50b is inactive for SCSI buses 54a and 54b while active for SCSI buses 54c and 54d.

From the perspective of the host computer 56, it does not matter which adaptor is operating. For the host computer, the identification (ID) of the target SCSI adaptor remains the same whether it is drive 50a or 50b. If one SCSI adaptor fails, the other adaptor of the pair responds to the failed adaptor's ID. As a result, therefore, the number of available addresses over SCSI buses connected to a SCSI adaptor is halved, since each SCSI port in addition to having its own identity, must respond to the address as its partner SCSI adaptor. As a result, therefore, while each SCSI adaptor has a different ID, the system must allocate two addresses to each SCSI bus/adaptor combination while only one adaptor will respond. Thus two addresses are allocated for each single host/disk drive controller interaction.

In operation, microcode and memory must be adjusted so that each of the SCSI adaptors knows which other SCSI adaptor it is supporting, as well as whether it is the active or inactive adaptor for a particular port connection. Further, the SCSI adaptors must be able to determine when a partner adaptor fails, thereby requiring the originally inactive partner to become the active partner for the supported ports of the pair. As a result, should a SCSI adaptor fail, there will only be a minor interruption, as described below, to the host computer(s) connected to the SCSI bus to which the pair is connected.

In operation of the system in accordance with FIG. 3, and referring to FIG. 4, the so-called SCSI adaptor fail-over support enables the one SCSI adaptor of a partnered pair to take over for its failing SCSI adaptor partner. This feature does not, however, correct for a host bus adaptor failure, but only where it is a SCSI adaptor itself which fails.

In the implementation and operation described hereafter, several basic assumptions have been made. First, some extra cabling will be required to create the failover connection identified in FIG. 3. This can be performed using a standard Y cable, unterminated at one SCSI adaptor and terminated (as indicated by a "T") at the other SCSI adaptor, adaptor 50b. In the normal operation of the system of FIG. 3, two methods can be used to detect either a failed or failing SCSI adaptor. In accordance with the first method, each SCSI adaptor sends a so-called 30 second Heartbeat signal to global memory 36 for access by other adaptors. Therefore, a take-over could take as long as 30 seconds. Such a length of time may inconvenience many applications, and some applications or hosts will not be able to tolerate that delay. Other hosts and applications can, however, tolerate such a delay. In either case, however, a second method of detecting a failing SCSI adaptor is initiated by the failing adaptor itself. In this instance, the failing SCSI adaptor, after receiving an exception interrupt and entering the IMPL (a configuration file) to monitor its operation, will notify its partner SCSI adaptor that it is failing. The partner (detecting) SCSI adaptor will then take over at the time of the exception reported by the failing SCSI adaptor over the SCSI bus. This method of operation eliminates the potential 30 second delay described in connection with the Heartbeat mechanism and thereby enables the system to better determine that a failure has occurred.

In accordance with a third assumption, and as illustrated in FIG. 3, between partnered SCSI adaptors, there is a direct correlation between ports. Thus, port 52a, the "A" port, backs up port 52e (the corresponding "A" port), port B backs up port B, etc. Finally, in a pair of SCSI adaptors which back up each other, each one will have both active and "hidden" devices (drives with which it can communicate). The hidden devices will correlate to the active devices of its partner SCSI adaptor.

The SCSI adaptors can communicate with each other, and determine their status, by using global memory. The microcode, which is embedded in the local control code for each of the SCSI adaptors, defines a table 500 in the global memory. There will be a separate entry for each SCSI adaptor. Each entry (called a memory mailbox), in this illustrated embodiment of the invention, will be 8 bytes long and will contain values as indicated in FIG. 4. Thus, in byte 0, will be an indication indicating that the record is valid; in byte 1 will be an identification of the SCSI adaptor that is the owner of this record entry; in byte 2 is the identification of the SCSI adaptor that the owner of this entry will back up; in byte 3 is an indication of whether this SCSI adaptor is in control of its active ports; and the remaining 4 bytes are used for a time stamp indicating the last time that this 8 byte entry was written.

Referring to FIG. 5, when the system is first turned on, the table, which has been loaded from the PC console, identifies whether the SCSI adaptor is active, or not. The identity of its active and hidden devices is provided by the adaptor's local EPROM. If the SCSI adaptor operates in a partnered relationship, the SCSI adaptor obtains the partner ID by accessing the global memory (step 200), and (a) if all the hidden devices on the current SCSI adaptor have corresponding non-hidden devices on the partner SCSI adaptor and (b) if there is only one partner for this SCSI adaptor, then the entry in the table for this SCSI adaptor is accepted. This is indicated at decision step 210 and step 220. Otherwise, the director is dropped to an adaptor failed state. This is indicated at step 230. As noted above, the SCSI adaptors send messages regarding any potential failure. Referring to FIG. 6, if a detection of a failed SCSI adaptor is realized, as indicated at 250, the detecting SCSI adaptor determines if it is a partner with the failed SCSI adaptor and if it is already not in control of its partner. If both statements are true, then, at step 260, the detecting SCSI adaptor updates the entry of the failed SCSI adaptor in global memory to reflect that the detecting adaptor is now active (step 270) and it waits for SCSI operations to complete on all ports of the detecting SCSI adaptor. (Step 280). A SCSI bus reset is then effected at 285.

Referring to FIG. 7, upon receipt of a SCSI bus reset, each attached SCSI adaptor, for which a SCSI adaptor failover has been enabled, performs the following functions. If the SCSI adaptor is not in control of its partner and is not inactive (that is operating normally) as tested at 290, the SCSI adaptor checks the failover table in global memory (step 300) and if the checking SCSI adaptor's partner is inactive, it takes over its partner's operations (step 320) and sets the table so that the inquiring SCSI adaptor is the active adaptor. (Step 330).

Alternatively, if the checking SCSI adaptor finds that it is not active, and its partner is in control, it sets its status to inactive (Step 340). Otherwise, after being in a normal or active state, it thereafter checks its partner's failover table (at 350) and if it finds its partner is not inactive, it sets its status to normal and releases, if required, its partner's devices (step 360). Otherwise, it remains active and its status remains active for all devices.

When a SCSI adaptor is ready to return to a normal state, all of the entries in its failover tables are set to reflect that status and a SCSI bus reset is effected. This reset and return to "normal" operation could be executed by either partner of a SCSI adaptor pair.

In this manner, upon the failure, or replacement, of a SCSI adaptor, appropriate actions are undertaken to insure that the host does not detect an unacceptably long failure condition mode of operation.

Additions, subtractions, and other modifications of the invention will be apparent to those practiced in this field and are within the scope of the following claims.

What is claimed is:

1. A disk drive controller system having a plurality of SCSI adapters connected to at least one host computer over at least one SCSI bus, one of said SCSI adapters terminating each bus, said system comprising said plurality of SCSI adapters each having at least one port, each SCSI bus configured for connection to at least one input/output port of a host computer for receiving data for storage by said disk drive controller, each SCSI bus being connected to respective ports of at least two SCSI adapters, one of said at least two SCSI adapters connected to a bus acting as the active adaptor for said host computer port, and another adaptor connected to said bus configured to back-up said active adaptor, adaptor memory for storing and updating the configuration of said SCSI adapters, and each said adaptor configured to take over for a failed adaptor with which it is partnered for communications over a SCSI bus.

2. The system of claim 1 further comprising each SCSI adaptor sending a heartbeat clock signal to a global memory for periodically indicating that the SCSI adaptor is functioning properly.

3. The system of claim 2 further comprising each SCSI adaptor sending a failure signal to an other partner SCSI adaptor to the other partner SCSI adaptor wherever a failure event is recognized by a said SCSI adaptor.

4. The system of claim 1 further wherein each SCSI adaptor periodically accesses its memory mailbox, and in response to the state read in the memory mailbox, decides whether to assume or remain the active adaptor of an adaptor pair.

5. A method for providing a physical back-up for a SCSI adaptor which receives and transmits read and write commands, respectively, from and to a host computer port, comprising the steps of connecting to a SCSI bus, to which a host computer port will also be connected, at least one controller port of each of at least two SCSI adapters, terminating said SCSI bus at one of said SCSI adapters, designating, for each controller port, one of said SCSI adapters connected to said SCSI bus as the active SCSI adaptor, and designating, for such port, each other SCSI adaptor connected to said SCSI bus as an inactive SCSI adaptor, and monitoring the operation of said SCSI adapters, whereby an inactive SCSI adaptor can take over for the active SCSI adaptor if the active adaptor fails to operate properly.

6. The method of claim 5 wherein said monitoring step comprises the step of sending, periodically, from each SCSI adaptor, a heartbeat signal to a global memory for access by each other SCSI adaptor.

7. The method of claim 5 wherein said monitoring step further comprises the step of sending a failure signal over said SCSI bus whenever a said SCSI adaptor identifies a failure event at said SCSI adaptor.

8. The method of claim 5 further comprising the step of changing the active SCSI adaptor on said SCSI bus whenever a failure mode of the active SCSI adaptor is detected during the monitoring step.

9. A method for providing a physical backup for a bus adaptor which receives and transmits read and write commands, respectively, from and to a host computer port, comprising the steps of connecting to a communications bus, to which a host computer port will also be connected, at least one controller port of at least two bus adaptors, designating for each controller port, one of said bus adaptors connected to the communications bus as the active bus adaptor, designating, for each such port, each other bus adaptor connected to said communications bus as an inactive bus adaptor, and monitoring the operation of the bus adaptors, whereby an inactive bus adaptor for a host port can take over for the active bus adaptor if the active bus adaptor fails to operate properly.

10. A disk drive controller system having a plurality of bus adapters connected to at least one host computer over at least one communications bus, the controller system comprising each of said plurality of bus adapters having at least one communications port, each communications bus being configured for connection to at least one input/output port of a host computer for receiving and sending data to and from storage by the disk drive controller, each communications bus being connected to respective ports of at least two bus adapters, one of the at least two bus adapters being connected to a said communications bus acting as the active bus adaptor for the host computer port and another adaptor connected to the communications bus being configured to back up the active adaptor, adaptor memory for storing and updating the configuration of the adapters, and each said bus adaptor configured to take over for a failed bus adaptor with which it is partnered for communications over the communications bus.

* * * * *